United States Patent
Narayanaswami et al.

(10) Patent No.: US 9,311,667 B2
(45) Date of Patent: Apr. 12, 2016

(54) MANAGING THE PURCHASE OF MULTIPLE ITEMS WITH MULTIPLE MODES OF FULFILLMENT

(71) Applicant: International Business Machines Corporation, Armonk, NY (US)

(72) Inventors: Chandrasekhar Narayanaswami, Wilton, CT (US); Ram Sangireddy, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 14/069,560

(22) Filed: Nov. 1, 2013

(65) Prior Publication Data

US 2015/0127492 A1 May 7, 2015

(51) Int. Cl.
*G06Q 30/00* (2012.01)
*G06Q 30/06* (2012.01)

(52) U.S. Cl.
CPC .................................. *G06Q 30/0635* (2013.01)

(58) Field of Classification Search
CPC .................................................... G06Q 30/635
USPC .............................. 705/26.1–27.2, 14.16, 319
See application file for complete search history.

(56) References Cited

U.S. PATENT DOCUMENTS

| 7,117,825 B2 † | 10/2006 | Phillips |
| 7,177,825 B1 † | 2/2007 | Borders |
| 8,271,356 B1 | 9/2012 | Miller |
| 8,494,274 B2 † | 7/2013 | Badharudeen |
| 8,527,373 B1 * | 9/2013 | Ricci et al. ...................... 705/28 |
| 8,676,660 B2 * | 3/2014 | Yu et al. ....................... 705/26.1 |
| 2011/0178889 A1 | 7/2011 | Abraham et al. |
| 2011/0320320 A1 * | 12/2011 | Dearlove et al. ............. 705/27.1 |
| 2013/0262315 A1 † | 10/2013 | Hruska |

FOREIGN PATENT DOCUMENTS

| WO | 0031657 A2 | 6/2000 |
| WO | 2008002993 A2 | 1/2008 |

OTHER PUBLICATIONS

Kaufman-Scarborough et al., "E-shopping in a Multiple Channel Environment," Journal of Consumer Marketing, vol. 19. No. 4, Jul. 2002, pp. 333-350.

* cited by examiner
† cited by third party

*Primary Examiner* — William Allen
*Assistant Examiner* — Anand Loharikar
(74) *Attorney, Agent, or Firm* — Yee & Associates, P.C.; Keivan Razavi

(57) ABSTRACT

A method for managing an electronic purchase of items. Multiple modes of fulfillment are identified for the items of the electronic purchase. A schedule for the multiple modes of fulfillment is also identified. Payment is received for the electronic purchase. Responsive to receiving the payment, the electronic purchase of the items is processed based on the schedule.

12 Claims, 8 Drawing Sheets

MANAGING THE PURCHASE OF MULTIPLE ITEMS WITH MULTIPLE MODES OF FULFILLMENT

BACKGROUND OF THE INVENTION

1. Field of the Invention

The disclosure relates generally to an improved data processing system, and, in particular, to a data processing system for processing items in an electronic purchase. Still more particularly, the present disclosure relates to a method and apparatus for hybrid processing of a single shopping cart using multiple modes of fulfillment.

2. Description of the Related Art

With traditional retail store shopping experiences, a customer selects items at the store by placing them in a shopping cart. The customer moves around the store with the items selected while looking for other items that they also may purchase. When the customer is ready to purchase the selected items, the customer moves to a location of a point of sale terminal. The customer then purchases the items at this point of sale terminal.

In some cases, a customer may wish to purchase more items than can reasonably be purchased using a traditional retail shopping experience at a brick and mortar store. For example, a customer may desire to purchase more items than can be carried in a shopping cart in the store. As another example, the customer may not have sufficient room at home to store items that are purchased from the store.

Retail stores, on occasion, offer customers discounted prices for bulk purchases. Bulk purchasing benefits both the retailer, who makes more sales, and the customer who gets a discounted price. However, customers placing a limited number of items of a particular type in their shopping cart may not be aware of a bulk price offer for the item. Additionally, even if the customer is aware of the bulk price, the customer may choose to ignore the bulk price offer due to limited storage, product expiration dates, and other factors.

One current approach to improving the retail store shopping experience includes having retail store clerks offer shipping to customers for large and heavy items. These items may be, for example, furniture and appliances. This approach is limited in a number of ways. For example, a sufficient number of retail store clerks may not be available to do the work of setting up the shipping of the items. As another example, the additional time spent by store clerks setting up the shipping of the items may be undesirable when compared to time the store clerks spend on other tasks.

Another approach to improving the retail store shopping experience includes having a customer purchase an item for pickup at the retail store. For example, when a large or expensive item is selected, a customer may be directed by the store to pick up the item at a specified location of the store. For example, the customer may be directed to pickup and purchase an item at a customer service desk at the retail store. As another example, the customer may be directed to collect the item, after purchase, at a location of the store suited for pickup of large items. In some cases, selecting items to purchase may be limited to in-store pickup at the time of purchase.

Therefore, it would be desirable to have a method, apparatus, and computer program product that takes into account at least some of the issues discussed above.

SUMMARY

In one illustrative embodiment, a method, apparatus, and computer program product for managing an electronic purchase of items is disclosed. An apparatus identifies multiple modes of fulfillment for the items of the electronic purchase. The apparatus also identifies a schedule for the multiple modes of fulfillment. The apparatus further receives payment for the electronic purchase. Responsive to receiving the payment, the apparatus processes the electronic purchase of the items based on the schedule.

DETAILED DESCRIPTION OF THE PREFERRED EMBODIMENT

Figure 1:
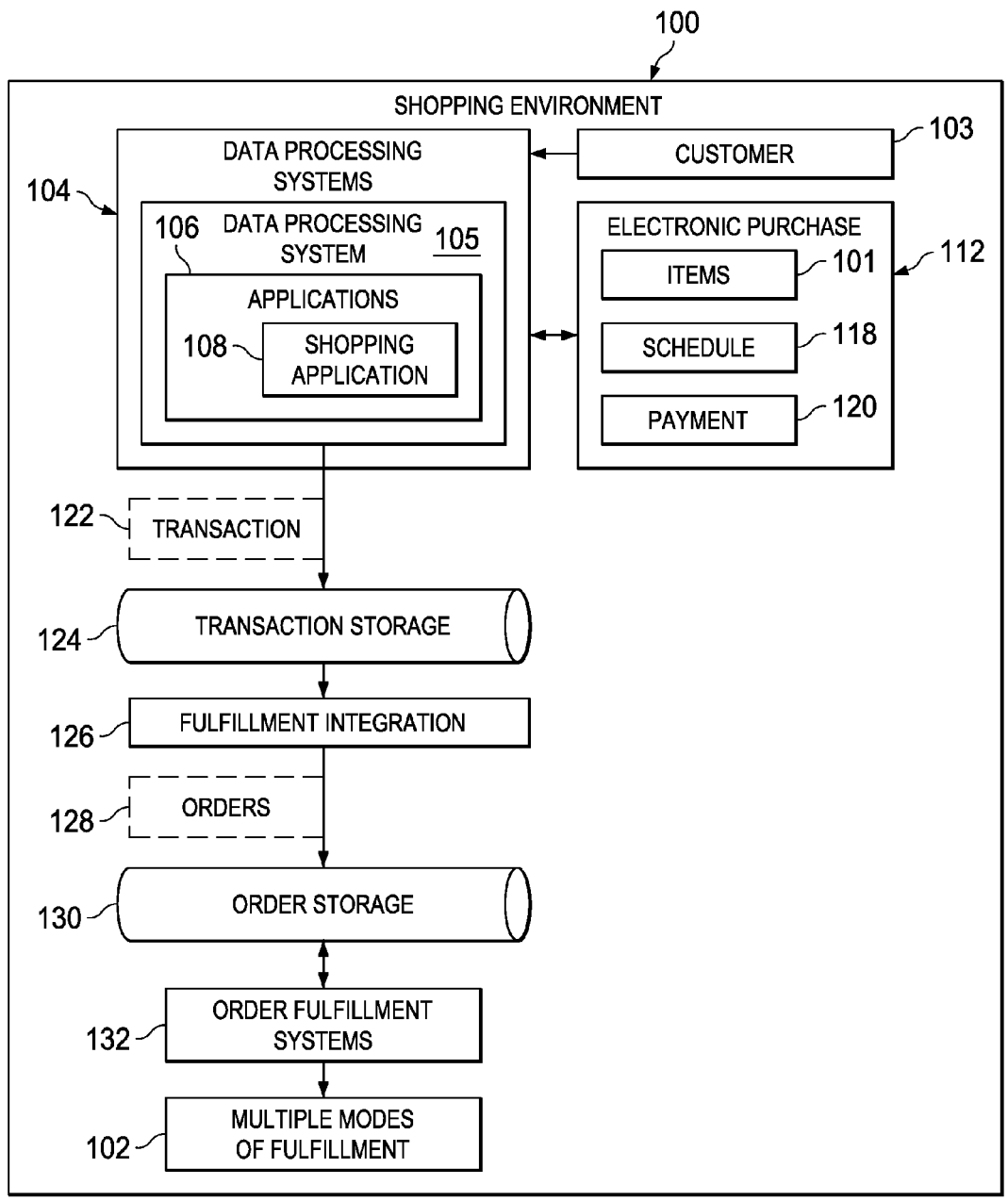
FIG. 1 is a block diagram of a data flow of a process for processing items in a shopping environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on remote computers, or entirely on the remote computers. In the latter scenario, the remote computers may be connected to the user's computer through any type of network, including a local area network (LAN) or a wide area network (WAN), or the connection may be made to an external computer. Further in this latter scenario, the remote computers may include hardware and software components in a shopping environment. For example, the components may be network appliances and other types of data processing systems that process items in the shopping environment.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments recognize and take into account a number of different considerations. For example, the illustrative embodiments recognize and take into account that existing data processing systems do not provide an ability to arrange a schedule for multiple modes of fulfillment for the items of an electronic purchase. As an example, existing systems do not include an ability to receive customer input for a schedule for multiple modes of fulfillment for items of an electronic purchase.

Thus, the illustrative embodiments provide a method, apparatus, and computer program product for managing an electronic purchase of items. For example, a number of components of a shopping environment may manage an electronic purchase of items. For example, a shopping application may identify multiple modes of fulfillment for the items of the electronic purchase. The shopping application may also identify a schedule for the multiple modes of fulfillment. The shopping application may further receive payment for the electronic purchase. In this example, responsive to receiving the payment, the shopping application may then process the electronic purchase of the items based on the schedule.

As another example, a number of components of a shopping environment may process items for a customer. For example, a shopping application may identify multiple modes of fulfillment for the items. In this example, the shopping application may then process the items with the multiple modes of fulfillment in a single transaction for a customer.

With reference now to the figures and, in particular, with reference to FIG. 1, a block diagram of a data flow of a process for processing items in a shopping environment is depicted in accordance with an illustrative embodiment. Shopping environment 100 is an illustrative example of an environment for processing items 101 using multiple modes of fulfillment 102 for fulfillment of items 101. Multiple modes of fulfillment 102 are the manner in which items 101 are delivered to customer 103. Each mode of fulfillment in multiple modes of fulfillment 102 may be a specific type of mode of fulfillment. A type of mode of fulfillment for a purchased item is a system for fulfilling the purchase of the item.

In these illustrative examples, multiple modes of fulfillment 102 include two or more modes of fulfillment. A mode of fulfillment in multiple modes of fulfillment 102 may be selected from one of a physical delivery to a physical location, electronic distribution of software products, electronic enablement of products, a pickup location, or any other suitable types of modes of fulfillment in shopping environment 100. As another illustrative example, a mode of fulfillment in multiple modes of fulfillment 102 may include an online retailer that provides electronic distribution of software to data processing systems.

As depicted, shopping environment 100 includes a number of data processing systems 104. In this illustrative example, data processing system 105 is an example of one data processing system in data processing systems 104. As used herein, "a number of" when used with reference to items means one or more items. For example, a number of data processing systems is one or more data processing systems.

In the illustrative examples, data processing systems 104 run applications 106. Shopping application 108 is an example of applications 106. In this illustrative example, shopping application 108 is running in data processing system 105.

In the illustrated example, shopping application 108 is configured to processes electronic purchases for customer 103. An electronic purchase of items is a purchase of items 101. The purchase may be performed in a number different ways, such as via a web site, an in-store kiosk, a mobile phone application, or any other suitable mechanism for purchasing items. For example, customer 103 may place items 101 into an electronic shopping cart. In this example, customer 103 may then purchase items 101. Electronic purchase 112 is an example of information about a purchase of items 101 by customer 103.

In this illustrative example, electronic purchase 112 identifies items 101, schedule 118, and payment 120. Items 101 in electronic purchase 112 are at least one of products, services, or combinations of products and services, that are bought and sold in shopping environment 100. In the depicted example, items 101 may be grouped to form a grouping of items 101. For example, a grouping of items 101 may be defined using shopping application 108. As used herein, a grouping of items 101 with multiple modes of fulfillment 102 is an arrangement of items 101 as a set of groups, wherein each group is assigned a particular mode of fulfillment in multiple modes of fulfillment 102. The arrangement of items 101 as a set of groups may include splitting one or more of items 101 into a one more different groups. As used herein, "a set of" when used with reference to items means a number of items.

As used herein, the phrase "at least one of", when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

In the illustrative example, schedule 118 is information specifying dates for fulfilling one or more of items 101. For example, schedule 118 may specify that one or more of items 101 are to be fulfilled on a particular date. As another example, schedule 118 also may specify repeating cycles for a set of dates for fulfilling items 101. As used herein, repeating cycles for a set of dates for fulfilling items 101 are selected from at least one of daily, weekly, monthly, quarterly, annually, or other suitable repeating cycles.

As depicted in the illustrated example, payment 120 is how items 101 are paid for in electronic purchase 112. Payment 120 may be, for example, at least one of an identification of the manner in which payment 120 is made, the actual information used to pay for items 101, authorization to pay for items 101, or other suitable information needed to purchase items 101. As used herein, payment 120 for items 101 may be performed using at least one of a credit card, an authorization to a third party electronic funds transfer, a wire transfer, a request to bill via invoice, or any other suitable way to purchase items 101.

In this illustrative example, data processing system 105 generates transaction 122 in a process for fulfilling items 101. As used herein, transaction 122 is an agreement between customer 103 and shopping environment 100 to purchase items 101. For example, transaction 122 may be an agreement between customer 103 and shopping environment 100 to pay for items 101 using multiple modes of fulfillment 102. As depicted, transaction 122 comprises information about an electronic purchase, such as electronic purchase 112 for customer 103. As also depicted, data processing system 105 may place transaction 122 in storage such as transaction storage 124. Transaction storage 124 may be at least one of an in memory buffer, a database, or any other suitable storage for transactions in shopping environment 100.

Fulfillment integration 126 is a component of shopping environment 100 configured to generate orders 128. Fulfillment integration 126 may be implemented in at least one of software, hardware, or a combination of software and hardware. For example, fulfillment integration 126 may be implemented in a computer system. In this example, the computer system may include one or more computers. In these illustrative examples, when more than one computer is present in fulfillment integration 126, those computers may communicate with each other through a communications medium such as a network.

As depicted, fulfillment integration 126 receives transaction 122 from transaction storage 124. Fulfillment integration 126 generates orders 128 based on transaction 122. In this illustrative example, each order in orders 128 is for fulfilling one or more of items 101. More particularly, each order in orders 128 is generated by fulfillment integration 126 according to a grouping of items 101 with multiple modes of fulfillment 102. As depicted, fulfillment integration 126 may place orders 128 in order storage 130. Order storage 130 may be at least one of an in memory buffer, a database, or any other suitable storage for orders in shopping environment 100.

Order fulfillment systems 132 is a number of data processing systems in shopping environment 100 and is configured to process orders 128. As depicted, order fulfillment systems 132 use multiple modes of fulfillment 102 for processing orders 128. For example, order fulfillment systems 132 may process orders 128 to fulfill items 101 using a grouping of items 101 with multiple modes of fulfillment 102.

The illustration of shopping environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

In some illustrative examples, additional applications in addition to shopping application 108 may be present within shopping environment 100. For example, networking applications may be run within shopping environment 100. In this example, networking applications may include web servers and web browsers for providing a user interface for shopping application 108. For example, customer 103 may interact with the user interface for shopping application 108 through a web browser that is communicating with a web server.

Also, although data processing systems 104, transaction storage 124, fulfillment integration 126, order storage 130, and order fulfillment systems 132 are shown as separate blocks in shopping environment 100, all or a portion of these may also be implemented in data processing systems 104 or other suitable components in shopping environment 100. In these illustrative examples, shopping environment 100 may be implemented by any combination of hardware and software products, and may also be implemented in one or more computer systems or a cluster of computer systems.

Figure 2:
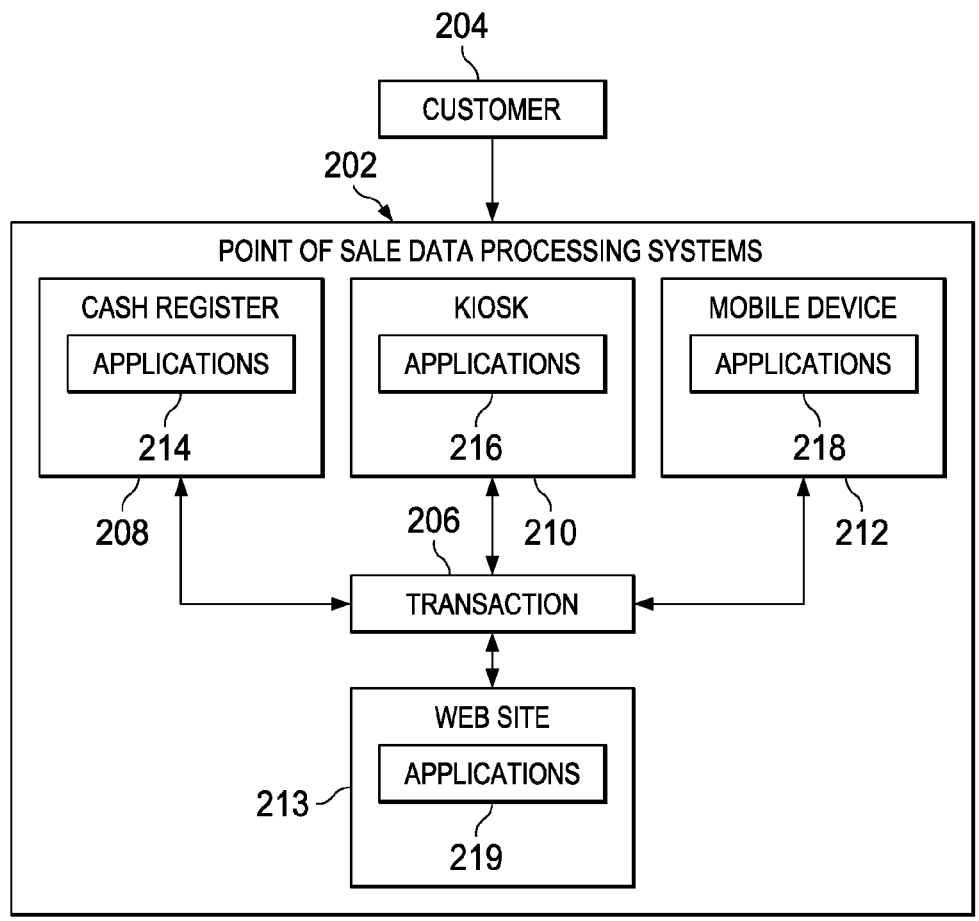
FIG. 2 is a block diagram of point of sale data processing systems involved in managing an electronic purchase of items in accordance with an illustrative embodiment.

Turning now to FIG. 2, a block diagram of point of sale data processing systems involved in managing an electronic purchase of items is depicted in accordance with an illustrative embodiment. Point of sale data processing systems 202 in FIG. 2 is an example of one implementation of data processing systems 104 in FIG. 1.

As depicted, point of sale data processing systems 202 is configured to integrate data processing systems accessed by customer 204. Customer 204 may be customer 103 in FIG. 1. Customer 204 accesses point of sale data processing systems 202 in a process to generate transactions, such as transaction 206. Transaction 206 is an example of transaction 122 in FIG. 1. Point of sale data processing systems 202 may include at least one of cash register 208, kiosk 210, mobile device 212, web site 213, or other suitable point of sale data processing systems. As depicted, cash register 208 includes applications 214, kiosk 210 includes applications 216, mobile device includes applications 218, and web site 213 includes applications 219. Applications 214, applications 216, applications 218, and applications 219 are examples of applications 106 in FIG. 1.

In this illustrative example, mobile device 212 is a data processing system that is portable. In the illustrated example, mobile device 212 may be owned by customer 204. Mobile device 212 is at least one of a smart phone, a personal data assistant, a tablet computer, or any other suitable type of consumer owned data processing system. Mobile device 212 may also be a data processing system provided to customer 204 for generating transaction 206. For example, mobile device 212 may be a physical shopping cart with data processing system attached for allowing customers to generate transactions.

In the illustrated example, applications 219 in web site 213 may include a web server application for integrating with web browsers. In this illustrated example, applications 219 may also include an electronic shopping cart application. For example, customer 204 may place items into an electronic shopping cart application of applications 219 of web site 213. In this example, customer 204 may then use applications 219 of web site 213 to generate transaction 206.

As depicted, customer 204 may use one or more of applications 214, applications 216, applications 218, and applications 219 in a process to generate transaction 206. In these illustrative examples, transaction 206 may be generated by a plurality of point of sale data processing systems 202. For example, customer 204 may use two or more of cash register 208, kiosk 210, mobile device 212, and web site 213 to generate transaction 206. For example, a portion of transaction 206 may be defined by cash register 208, a different portion of transaction 206 may be defined by kiosk 210, still another potion may be defined by mobile device 212, and still further another portion may be defined by web site 213. In this example, the plurality of point of sale data processing systems 202 may integrate with each other in the process to generate of transaction 206. For example, one data processing system in point of sale data processing systems 202 may share a portion of transaction 206 with another data processing system in point of sale data processing systems 202. As another example, the generation of transaction 206 may be completed on one data processing system where a portion of the transaction is defined by another data processing system in point of sale data processing systems 202.

The illustration of point of sale data processing systems 202 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, other types of point of sale data processing systems may be included in point of sale data processing systems 202. For example, point of sale data processing systems 202 may include mobile devices 212 used by employees of a retail store. For example, employees of a retail store may use at least one of portable digital assistants, mobile phones, tablets, or other suitable data processing systems that are portable. In this example, the mobile devices used by employees of the retail store may be configured to perform functions of a cash register. As another example, employees of a retail store may access a mobile device of a customer to enable features of the device.

Figure 3:
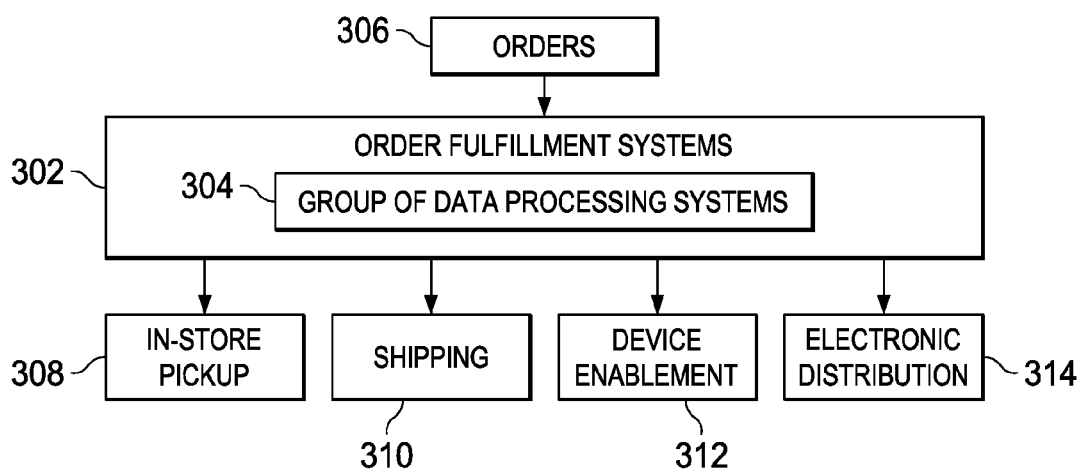
FIG. 3 is a block diagram of order fulfillment systems involved in processing orders for an electronic purchase of items in accordance with an illustrative embodiment.

With reference now to FIG. 3, a block diagram of order fulfillment systems involved in processing orders for an electronic purchase of items is depicted in accordance with an illustrative embodiment. Order fulfillment systems 302 in FIG. 3 is an example of one implementation of order fulfillment systems 132 in FIG. 1.

As depicted order fulfillment systems 302 may include group of data processing systems 304. In this illustrative example, group of data processing systems 304 is one or more data processing systems. Group of data processing systems 304 may be a cluster of managed data processing systems. Group of data processing systems 304 may also include two or more data processing systems on a single computing device. Each of the data processing systems in group of data processing systems 304 may be implemented in at least one of hardware, software, or a combination of hardware and software.

In this illustrative example, group of data processing systems 304 processes orders 306. Orders 306 in FIG. 3 is an example of orders 128 in FIG. 1. For example, group of data processing systems 304 may store orders 306, identify sources for orders 306, identify fulfillment mechanisms for orders 306, identify destinations for orders 306, validate orders 306, and route orders 306 to other data processing systems. In this illustrative example, each of the data processing systems identified by group of data processing systems 304 as destinations for orders 306 is an example of a mode of fulfillment in multiple modes of fulfillment 102 in FIG. 1. As depicted, group of data processing systems 304 routes orders 306 to at least one of in-store pickup 308, shipping 310, device enablement 312, electronic distribution 314, or other suitable types of data processing systems in a process for fulfilling orders of customers.

As depicted, in-store pickup 308 is a data processing system that processes in-store pickup orders. Shipping 310 is a data processing system that processes shipping orders. A shipping order in orders 306 is an order for delivery to a physical location. Device enablement 312 is a data processing system that processes device enablement orders. An order for device enablement in orders 306 is a change in the function of a data processing system selected from at least one of clock speed, storage capacity, features of a phone system, or other suitable hardware, software, and combinations of hardware and software of data processing systems. Electronic distribution 314 is a data processing system that processes electronic distribution orders. An order for electronic distribution in orders 306 is an order to distribute software to a data processing system. For example, an order in orders 306 to distribute software to a data processing system may include downloading a particular software application to a data processing system of a customer.

The illustration of order fulfillment systems 302 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, other types of modes of fulfillment may be identified as a destination for orders 306 routed from order fulfillment systems 302. A data processing system of a third party fulfillment provider may, for example, also be identified as a mode of fulfillment for receiving an order in orders 306 by order fulfillment systems 302. The third party fulfillment provider, of this example, is an example of a mode of fulfillment in multiple modes of fulfillment 102 in FIG. 1. A third party fulfillment provider is an entity that processes orders 306 in a process for fulfilling items for customers.

Figure 4:
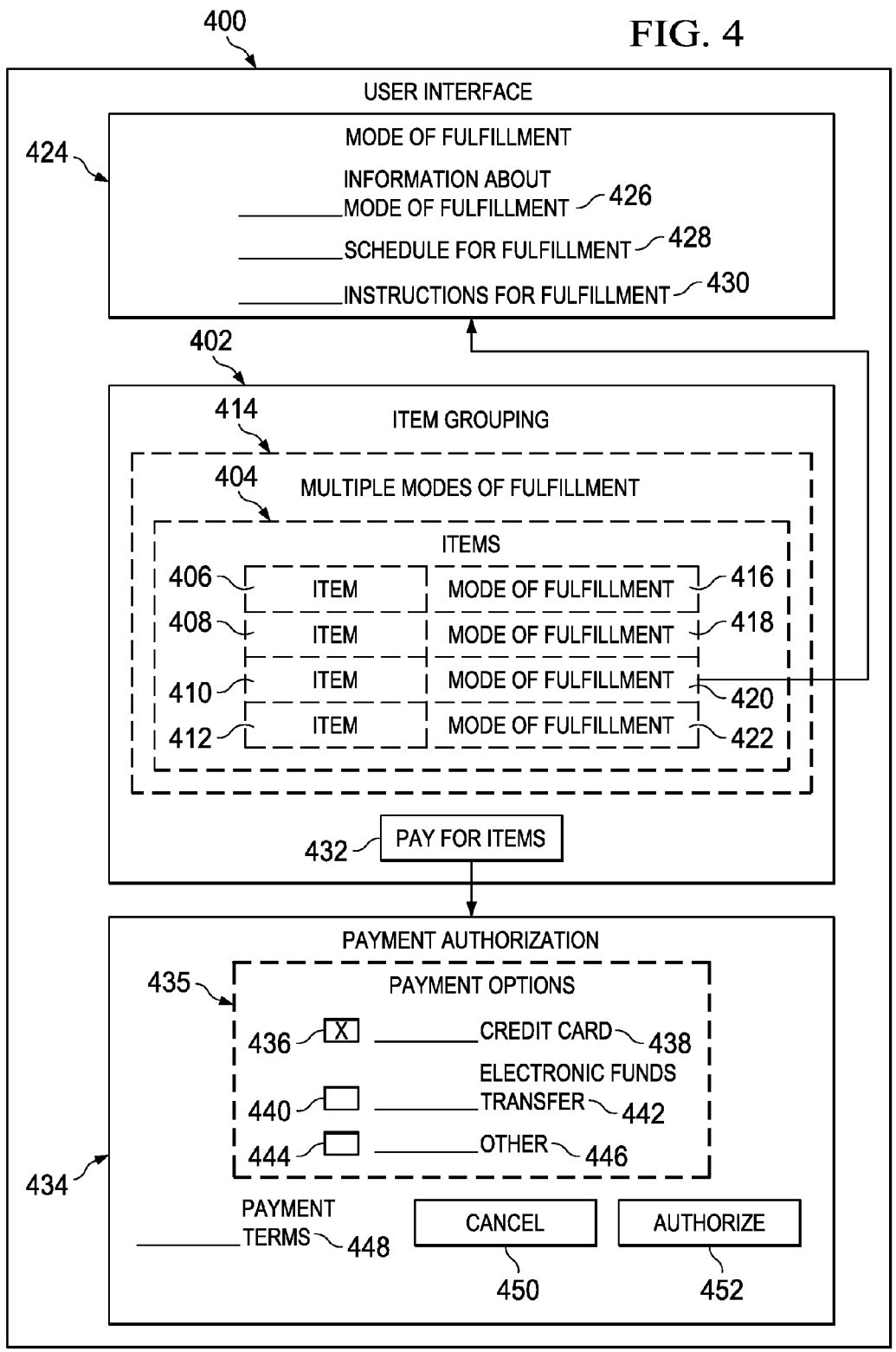
FIG. 4 is an illustration of a graphical user interface of a shopping application for grouping items with multiple modes of fulfillment in accordance with an illustrative embodiment.

Turning next to FIG. 4, an illustration of a graphical user interface of a shopping application for grouping items with multiple modes of fulfillment is depicted in accordance with an illustrative embodiment. In this illustrative example, user interface 400 is an example of one implementation for a graphical user interface for shopping application 108 in FIG. 1. For example, user interface 400 may be displayed to customer 103 in FIG. 1.

As depicted, user interface 400 includes item grouping 402. Item grouping 402 is a window for grouping items 404. Item 406, item 408, item 410, and item 412 in items 404 are examples of items 101 in FIG. 1. Mode of fulfillment 416, mode of fulfillment 418, mode of fulfillment 420, and mode of fulfillment 422 in multiple modes of fulfillment 414 are examples of multiple modes of fulfillment 102 in FIG. 1. Item grouping 402 is used, in this illustrated example, to group items 404 with multiple modes of fulfillment 414. In this illustrated example, each mode of fulfillment in multiple modes of fulfillment 414 may also be the same mode of fulfillment and combinations of different modes of fulfillment for fulfillment of items. In the illustrated example, each mode of fulfillment in multiple modes of fulfillment 414 is selected from at least one of a physical delivery to a physical location, electronic distribution of software products, electronic enablement of products, a pickup location, or any other suitable types of modes of fulfillment.

For example, mode of fulfillment 416 may be a physical delivery to a first physical location; mode of fulfillment 418 may be a physical delivery to a second physical location that is different than the first physical location; mode of fulfillment 420 may be an electronic enablement of item 410 on a product; and mode of fulfillment 422 may be an electronic enablement of item 412 on the same product that item 410 is being electronically enabled on. In this example, item 406 is a first group and item 408 is a second group. Item 406 and item 408 are identified as two different groups that have different modes of fulfillment. In this example, item 410 and item 412 are identified as a third group. Item 410 and item 412 are identified in the third group as a single group because mode of fulfillment 420 is not different than mode of fulfillment 422.

In this illustrative example, mode of fulfillment 424 is a window in user interface 400 for mode of fulfillment 420. Other windows, not shown, may also be available for mode of fulfillment 416, mode of fulfillment 418, and mode of fulfillment 422. In the illustrated example, mode of fulfillment 424 includes information about mode of fulfillment 426. Information about mode of fulfillment 426 is information describing mode of fulfillment 420. For example, information about mode of fulfillment 426 may include at least one of an identification of mode of fulfillment 420 as a particular type of mode of fulfillment, a location where mode of fulfillment 420 is located, a cost for using mode of fulfillment 420, or other suitable information about mode of fulfillment 420 for use in grouping items 404 with multiple modes of fulfillment 414.

In the illustrated example, mode of fulfillment 424 includes schedule for fulfillment 428. Schedule for fulfillment 428 is an example of schedule 118 in FIG. 1. Mode of fulfillment 424 also includes instructions for fulfillment 430 in this illustrated example. Instructions for fulfillment 430 is instructions explaining who, where, and how to fulfill one or more of items 404. For example, instructions for fulfillment 430 may specify a portion of items 404 to be fulfilled via shipping to a particular address. As another example, instructions for fulfillment 430 may specify an entity authorized to receive a portion of items 404. As still another example, instructions for fulfillment 430 may specify an account number and password to use when fulfilling a portion of items 404. In this example, the account number and the password may be used when distributing software and performing device enablement.

Pay for items 432 in item grouping 402 is a button for starting a process for payment for items 404. Pressing pay for items 432 brings up payment authorization 434. Payment authorization 434 is an example of a window for receiving a payment, such as payment 120 in FIG. 1. In other examples, not shown, payment authorization 434 may include using at least one of a physical credit card reader, a physical smart card reader, a web page of web based payment system, or any other suitable way to make payment 120 for items 404.

As depicted, payment options 435 is a portion of payment authorization 434 for selecting payment options. Selection 436 is a selection button for choosing credit card 438 to pay for items 404. In this illustrated example, selection 436 is checked indicating credit card 438 will be used to make payment 120 for items 404.

In the illustrated example, selection 440 is a selection button for choosing electronic funds transfer 442 to pay for items 404. Selection 444 is a selection button for choosing other 446 to pay for items 404. Other 446 may include at least one of invoicing, expense accounts, or other suitable types of payment.

Payment terms 448 is a portion of payment authorization 434 specifying terms of payment for items 404, in the illustrated example. Payment terms 448 may include at least one of account numbers, validation information, or other suitable information for specifying payment. Validation information in payment terms 448 may include at least one of account addresses, account dates, account validation codes, or other suitable terms of payment. Cancel 450 is a button in payment authorization 434 for cancelling payment. Authorize 452 is a button in payment authorization 434 for authorizing payment for items 404. In these illustrative examples, pressing authorize 452 may begin a process for delivering a grouping of items 404 with multiple modes of fulfillment 414.

In this illustrative example, access to user interface 400 may be restricted to employees of a retail store. When access is restricted to employees of the retail store, customers may interact with the employees to make selections in user interface 400. When access is not restricted to employees, customers may directly access user interface 400.

The illustration of user interface 400 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, user interface 400 may include a window, not shown, for selecting from a list of available modes of fulfillment. In this example, an available mode of fulfillment may be selected as one of the modes of fulfillment of items in multiple modes of fulfillment 414. As another example, user interface 400 may also include a window, not shown, for selecting from a list of items available for purchasing. In this example, an item available for purchasing may be selected as one of items 404.

Figure 5:
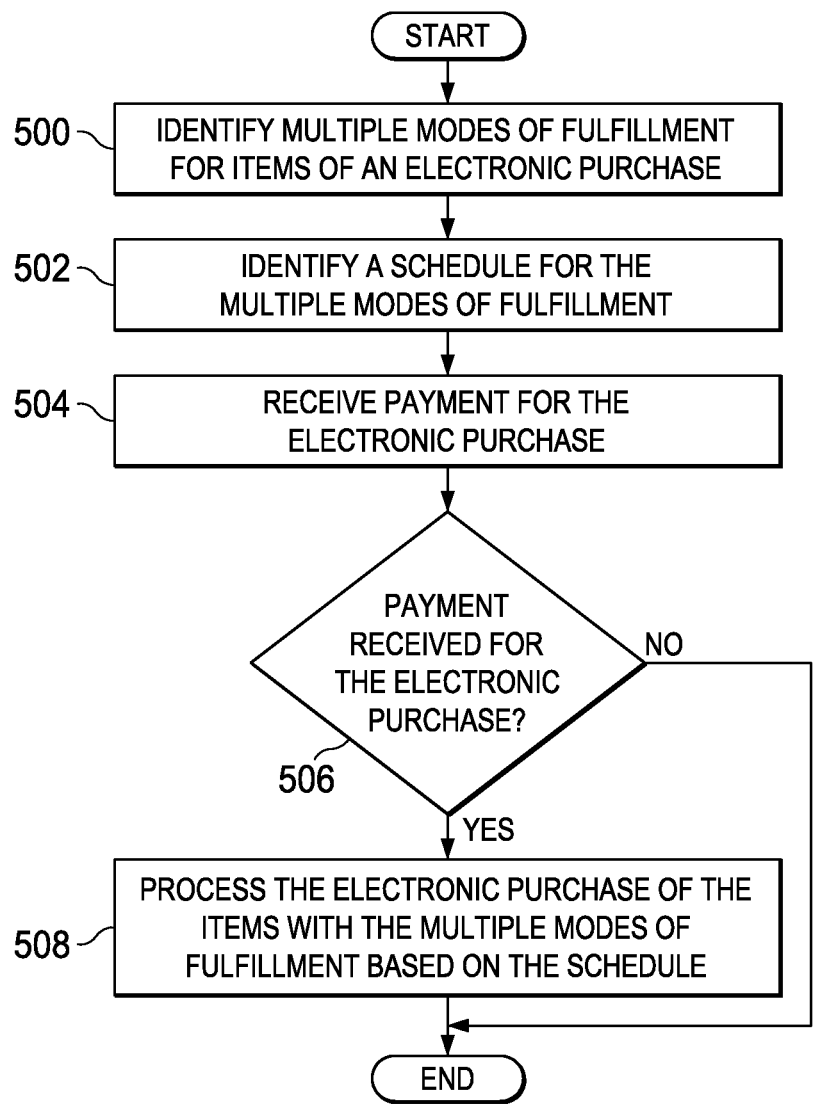
FIG. 5 is a flowchart of a process for managing an electronic purchase of items in accordance with an illustrative embodiment.

With reference next to FIG. 5, an illustration of a flowchart of a process for managing an electronic purchase of items is depicted in accordance with an illustrative embodiment. The steps illustrated in FIG. 5 are examples of steps that may be used to process electronic purchase 112 in FIG. 1. These steps may be implemented in data processing systems 104 in FIG. 1 and in other data processing systems in FIG. 1. For example, the different steps may be performed by shopping application 108 in FIG. 1, fulfillment integration 126 in FIG. 1, and order fulfillment systems 132 in FIG. 1.

The process begins by identifying multiple modes of fulfillment for items of an electronic purchase (step 500). The multiple modes of fulfillment identified in step 500 for the items of the electronic purchase is an example of multiple modes of fulfillment 102 in FIG. 1 for items 101 in FIG. 1 of electronic purchase 112 in FIG. 1. The process also identifies a schedule for the multiple modes of fulfillment (step 502). The schedule identified in step 502 is an example of schedule 118 in FIG. 1.

As depicted, the process may receive a payment for the electronic purchase (step 504). The payment received in step 504 is an example of payment 120 in FIG. 1. A determination is made as to whether the payment has been received for the electronic purchase (step 506). If the process has not received the payment for the electronic purchase, the process terminates.

Otherwise, the process then processes the electronic purchase of the items with the multiple modes of fulfillment based on the schedule (step 508), with the process terminating thereafter. The processing performed in step 508 may be performed by data processing systems 104, fulfillment integration 126, order fulfillment systems 132, and other data processing systems in shopping environment 100. The process in FIG. 5 may be repeated any number of times to process additional electronic purchases.

Figure 6:
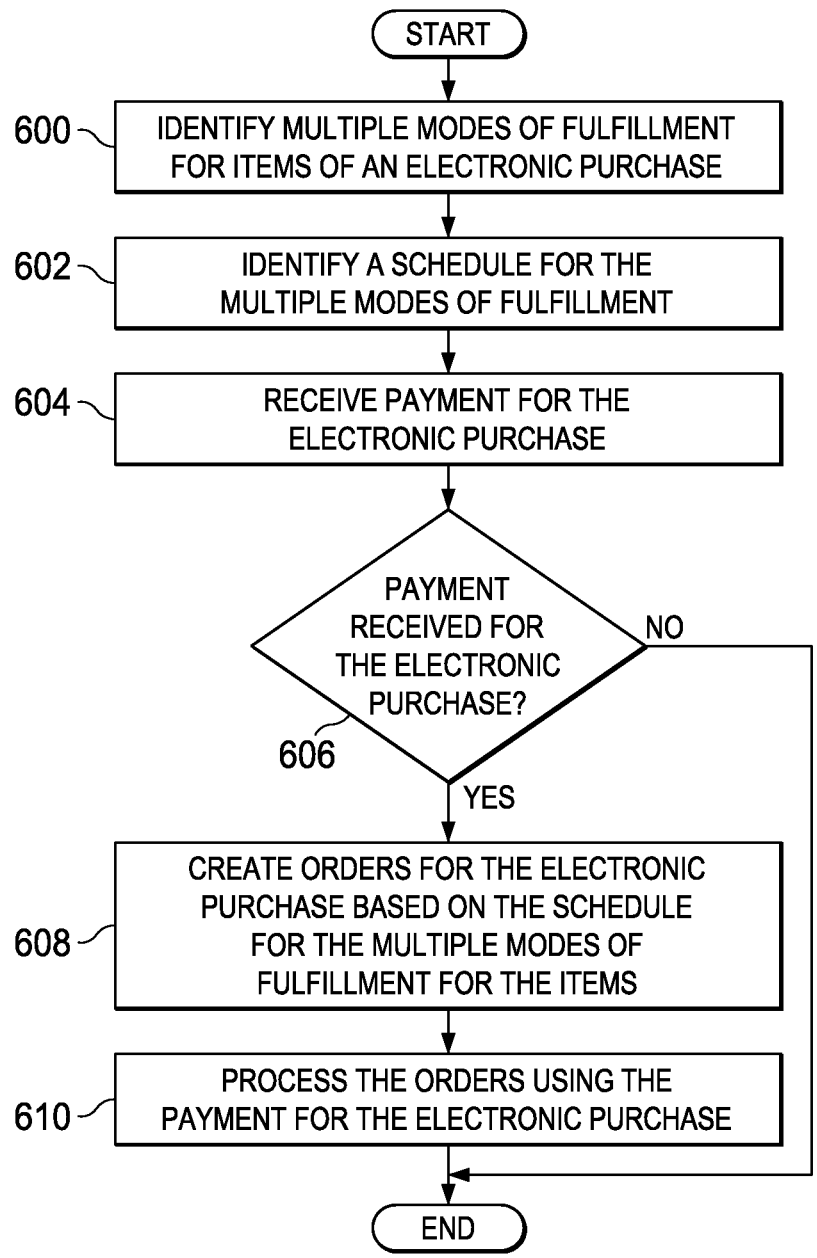
FIG. 6 is a flowchart of a process for processing orders for a grouping of items of an electronic purchase of the items in accordance with an illustrative embodiment.

With reference next to FIG. 6, an illustration of a flowchart of a process for processing orders for a grouping of items of an electronic purchase of the items is depicted in accordance with an illustrative embodiment. The steps illustrated in FIG. 6 may be used to process orders 128 for a group of items 101 of electronic purchase 112 in FIG. 1. These steps may be implemented in data processing systems 104, fulfillment integration 126, order fulfillment systems 132, and other data processing systems in shopping environment 100 in FIG. 1.

The process begins by identifying multiple modes of fulfillment for items of an electronic purchase (step 600). The multiple modes of fulfillment identified in step 600 for the items of the electronic purchase is an example of multiple modes of fulfillment 102 in FIG. 1 for items 101 in FIG. 1 of electronic purchase 112 in FIG. 1. The process also identifies a schedule for the multiple modes of fulfillment (step 602). The schedule identified in step 602 is an example of schedule 118 in FIG. 1.

As depicted, the process may receive a payment for the electronic purchase (step 604). The payment received in step 604 is an example of payment 120 in FIG. 1. A determination is made as to whether the payment has been received for the electronic purchase (step 606). If the process has not received the payment for the electronic purchase, the process terminates. Otherwise, if the process has received the payment for the electronic purchase, the process creates orders for the electronic purchase based on the schedule for the multiple modes of fulfillment for the items (step 608). The generating of the orders in step 608 may be performed by fulfillment integration 126 and other data processing systems in shopping environment 100 in FIG. 1. The orders generated in step 608 are an example of orders 128 in FIG. 1.

Next, the process processes the orders using the payment for the electronic purchase (step 610), with the process terminating thereafter. The processing performed in step 610 may be performed by data processing systems 104, fulfillment integration 126, order fulfillment systems 132, and other data processing systems in shopping environment 100. The process in FIG. 6 may be repeated any number of times to process additional electronic purchases.

Figure 7:
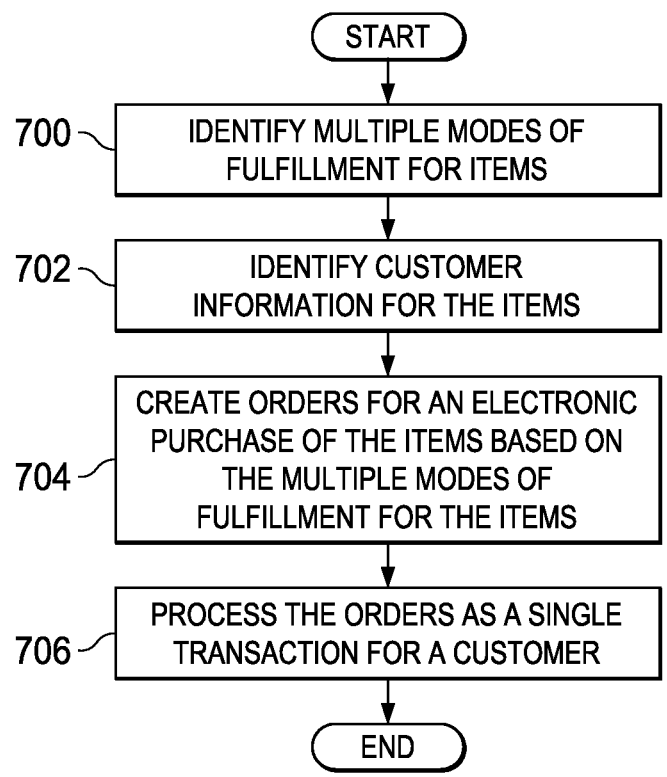
FIG. 7 is a flowchart of a process for processing items in accordance with an illustrative embodiment.

With reference next to FIG. 7, an illustration of a flowchart of a process for processing items is depicted in accordance with an illustrative embodiment. The steps illustrated in FIG. 7 may be used to process items 101 in FIG. 1. These steps may be implemented in data processing systems 104, fulfillment integration 126, order fulfillment systems 132, and other data processing systems in shopping environment 100 in FIG. 1.

The process begins by identifying multiple modes of fulfillment for items (step 700). The multiple modes of fulfillment of the items identified in step 700 is an example of two or more modes of fulfillment in multiple modes of fulfillment 102 in FIG. 1 of items 101. The process also identifies customer information for the items (step 702). The customer information identified in step 702 may be schedule for fulfillment 428 in FIG. 4, payment terms 448 in FIG. 4, instructions for fulfillment 430 in FIG. 4, and other suitable information for processing items in shopping environment 100 in FIG. 1.

As depicted, the process then creates orders for an electronic purchase of the items based on the multiple modes of fulfillment for the items (step 704). The generating of the orders in step 704 may be performed by data processing systems 104, fulfillment integration 126, and other data processing systems in shopping environment 100. Next, the process processes the orders as a single transaction for a customer (step 706) with the process terminating thereafter. The single transaction in step 706 is an example of transaction 122 in FIG. 1. The processing performed in step 706 may be performed by data processing systems 104, fulfillment integration 126, order fulfillment systems 132, and other data processing systems in shopping environment 100 in FIG. 1.

Figure 8:
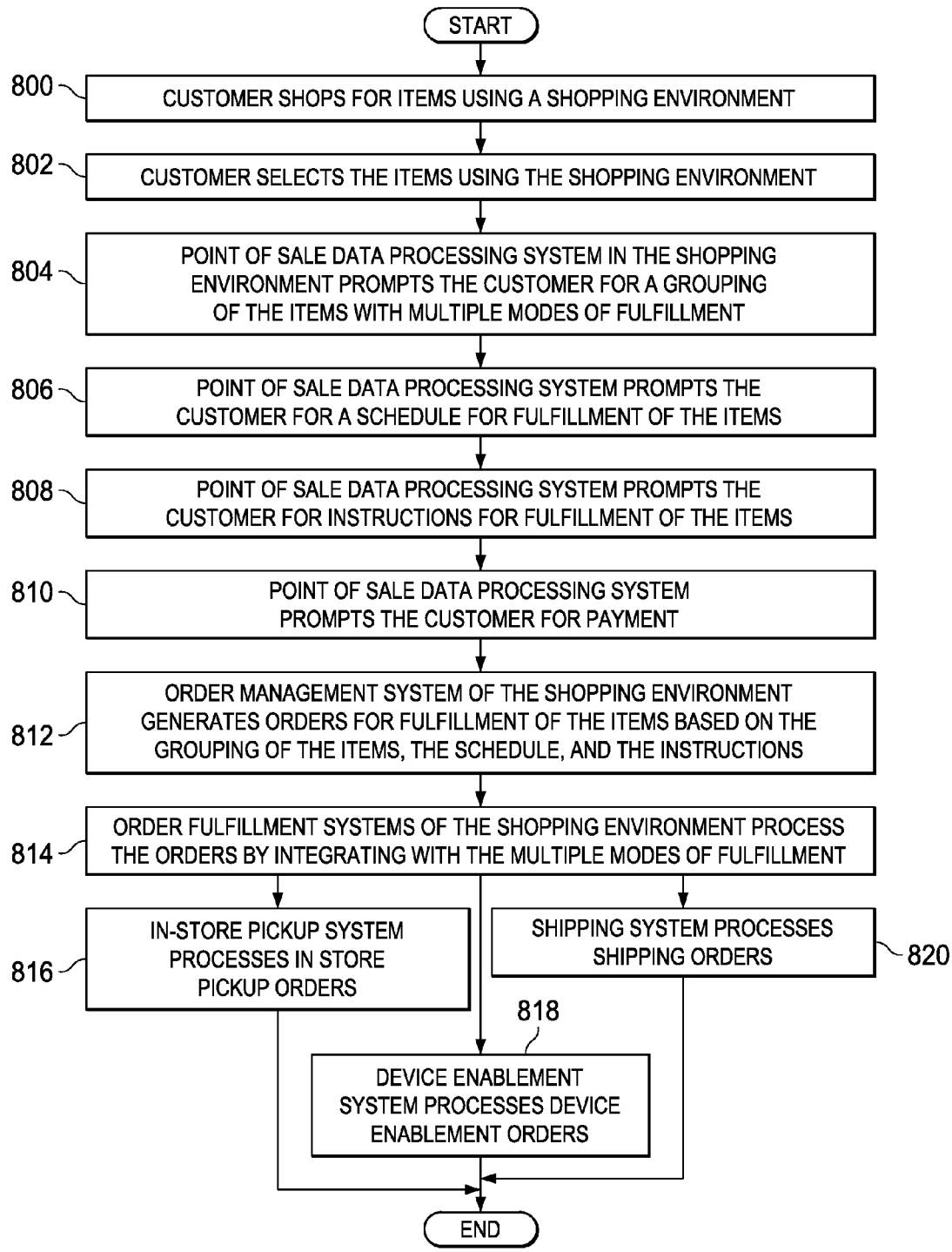
FIG. 8 is a flowchart of a process for managing an electronic purchase of items in accordance with an illustrative embodiment.

With reference next to FIG. 8, an illustration of a flowchart of a process for managing an electronic purchase of items is depicted in accordance with an illustrative embodiment. The steps illustrated in FIG. 8 are examples of steps that may be used to process electronic purchase 112 of items 101 in FIG. 1. These steps may be implemented in data processing systems 104 and in other data processing systems in FIG. 1. For example, the different steps may be performed by shopping application 108, fulfillment integration 126, and order fulfillment systems 132 in FIG. 1.

The process begins with a customer shopping for items using a shopping environment (step 800). The customer is an example of customer 103 and the shopping environment is an example of shopping environment 100 in FIG. 1. In the next step of the process, the customer selects the items using the shopping environment (step 802). For example, the customer may interact with shopping application 108 in FIG. 1 to select items 101. Items selected by the customer in step 802 are an example of items 101 in FIG. 1. The process continues with a point of sale data processing system in the shopping environment prompting the customer for a grouping of the items with multiple modes of fulfillment (step 804). The point of sale data processing system in step 804 is an example of point of sale data processing systems 202 in FIG. 2.

As depicted in subsequent steps of the process, the point of sale data processing system prompts the customer for a schedule for fulfillment of the items (step 806), for instructions for fulfillment of the items (step 808), and for payment (step 810). The schedule for fulfillment received in step 806 is an example of schedule for fulfillment 428 in FIG. 4. The instructions for fulfillment received in step 808 are examples of instructions for fulfillment 430 in FIG. 4. The payment received in step 810 is an example of payment 120 in FIG. 1. For example, the payment received may be based on selections of payment options 435 and payment terms 448 in FIG. 4.

Responsive to receiving responses to the prompts, the process continues with an order management system of the shopping environment generating orders for delivery of the items based on the grouping of the items, the schedule, and the instructions (step 812). The order management system in step 812 is an example of fulfillment integration 126 in FIG. 1.

In the next step of the process, order fulfillment systems of the shopping environment process the orders by integrating with the multiple modes of fulfillment (step 814). As depicted, the process then processes the orders using an in-store pickup system for in-store pickup orders (step 816), a device enablement system for device enablement orders (step 818), and a shipping system for shipping orders (step 820). The order fulfillment systems in step 814 are an example of group of data processing systems 304 in FIG. 3. The in-store pickup system in step 816 is an example of in-store pickup 308; the device enablement system in 818 is an example of device enablement 312; and the shipping system in step 820 is an example of shipping 310 in FIG. 3.

Figure 9:
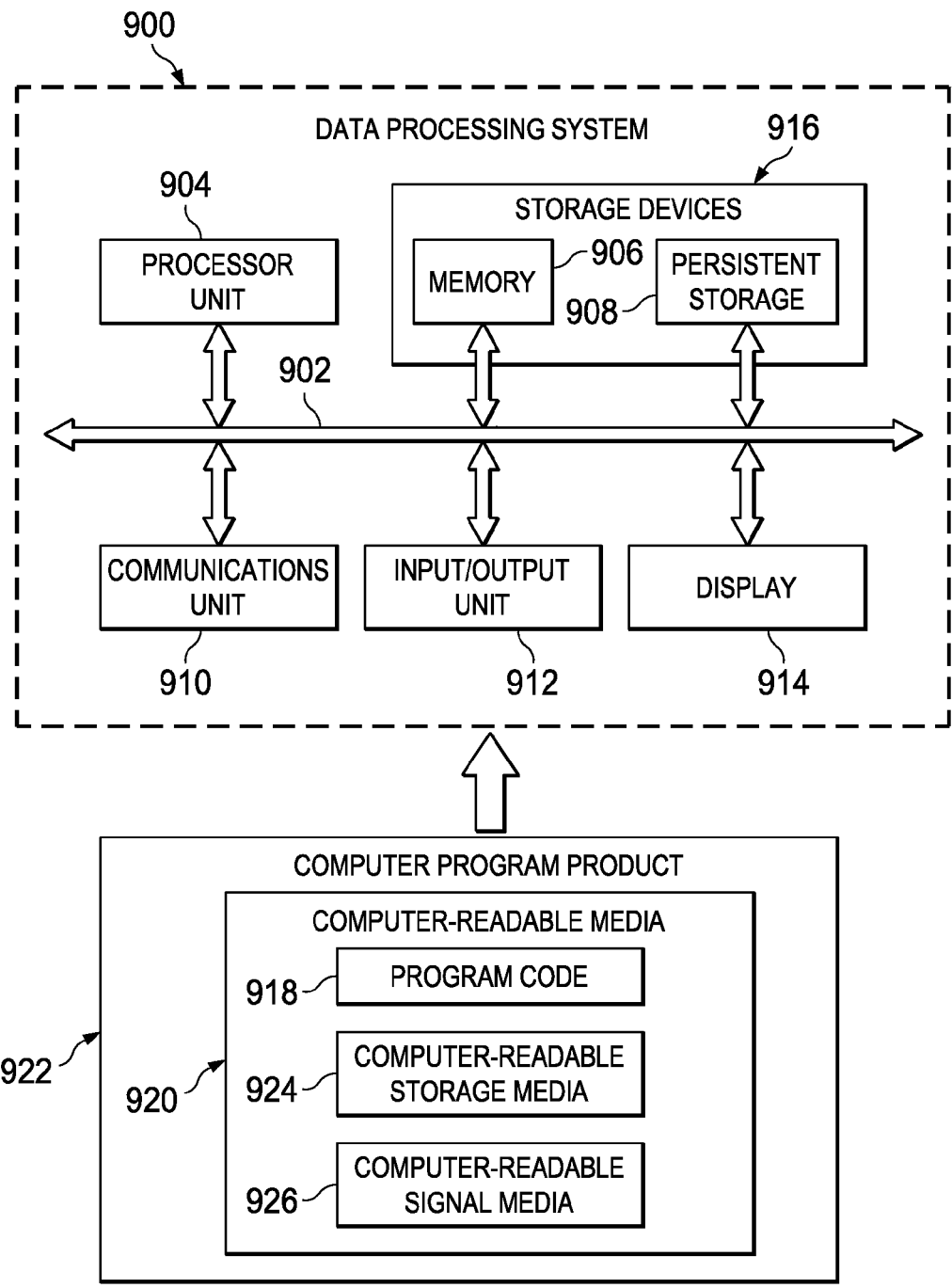
FIG. 9 is an illustration of a data processing system in accordance with an illustrative embodiment.

Turning now to FIG. 9, an illustration of a data processing system is depicted in accordance with an illustrative embodiment. Data processing system 900 is an example of a data processing system that may be used to implement data processing systems 104, transaction storage 124, fulfillment integration 126, order storage 130, and order fulfillment systems 132 in FIG. 1. More particularly, data processing system 900 may be used to implement point of sale data processing systems 202 in FIG. 2. In this illustrative example, data processing system 900 includes communications framework 902, which provides communications between processor unit 904, memory 906, persistent storage 908, communications unit 910, input/output (I/O) unit 912, and display 914. In these examples, communications frame work 902 may be a bus system.

Processor unit 904 serves to execute instructions for software that may be loaded into memory 906. Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. In these illustrative examples, the instructions are in a functional form on persistent storage 908. These instructions may be loaded into memory 906 for execution by processor unit 904. The processes of the different embodiments may be performed by processor unit 904 using computer implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900. In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations. For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 918 may be omitted because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications framework 902 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 906, or a cache, such as found in an interface and memory controller hub that may be present in communications framework 902.

Thus, the illustrative embodiments provide a method, apparatus, and computer program product for managing an electronic purchase of items. In some examples, a program identifies multiple modes of fulfillment for the items of the electronic purchase. In these examples, the program also identifies a schedule for the multiple modes of fulfillment. The program next receives payment for the electronic purchase. Responsive to receiving the payment for the electronic purchase, the program then processes the electronic purchase of the items based on the schedule. In these and other examples, managing an electronic purchase of the items may also comprise steps for processing the items in a single transaction for a customer.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing an electronic purchase of multiple items via a network, the method comprising:
   receiving, by a point of sale data processing system, an electronic purchase of at least a device functionality item and a software item;
   determining, by the point of sale data processing system, a specific mode of fulfillment for each item being purchased;
   assigning, by the point of sale data processing system in response to the determining, a first mode of fulfillment to the device functionality item of the electronic purchase, the first mode of fulfillment comprising device enablement;
   assigning, by the point of sale data processing system in response to the determining, a second mode of fulfillment to the software item of the electronic purchase, the second mode of fulfillment comprising electronic distribution;
   determining, by the point of sale data processing system, a schedule for the first mode and the second mode of fulfillment;
   receiving, by the point of sale data processing system, payment for the electronic purchase; and
   responsive to receiving the payment for the electronic purchase, fulfilling the electronic purchase based on the schedule such that:
      in accordance with the first mode of fulfillment, the point of sale data processing system enables one or more features of a device associated with a customer of the electronic purchase, changes a clock speed of the device associated with the customer of the electronic purchase, or, changes a storage capacity of the device associated with the customer of the electronic purchase; and,
      in accordance with the second mode of fulfillment, electronically distributing, by the point of sale data processing system, the software item to the device associated with the electronic purchase.

2. The method of claim 1, further comprising:
   creating, by the point of sale data processing system, orders for the electronic purchase based on the schedule for the first mode and the second mode of fulfillment for the multiple items; and
   processing, by the point of sale data processing system, the orders using the payment for the electronic purchase.

3. The method of claim 1, wherein the point of sale data processing system is a cash register.

4. The method of claim 1, wherein the schedule includes scheduled dates for the first mode and the second mode of fulfillment for one or more portions of the multiple items of the electronic purchase.

5. The method of claim 4, wherein the schedule is selected based on user input defining the scheduled dates.

6. The method of claim 5, wherein the user input further specifies repeating cycles for the scheduled dates selected from daily, weekly, monthly, quarterly, annually, and other suitable repeating cycles.

7. A point of sale data processing system for managing an electronic purchase of multiple items via a network, the point of sale data processing system comprising:
   a bus system;
   one or more computer readable storage devices connected to the bus system, wherein at least one of the one or more computer readable storage devices stores program instructions; and
   one or more processor units connected to the bus system, wherein at least one of the one or more processor units executes the program instructions to:
   receive an electronic purchase of at least a device functionality item and a software item;
   determine a specific mode of fulfillment for each item being purchased;
      assign, in response to determining, a first mode of fulfillment to the device functionality item of the electronic purchase, the first mode of fulfillment comprising device enablement;
      assign, in response to determining, a second mode of fulfillment to the software item of the electronic purchase, the second mode of fulfillment comprising electronic distribution;
   determine a schedule for the first mode and the second mode of fulfillment;
   receive a payment for the electronic purchase; and
   fulfill, in response to receiving the payment for the electronic purchase, the electronic purchase based on the schedule such that:
      in accordance with the first mode of fulfillment, the point of sale data processing system enables one or more features of a device associated with a customer of the electronic purchase, changes a clock speed of the device associated with the customer of the electronic purchase, or, changes a storage capacity of the device associated with the customer of the electronic purchase; and,
      in accordance with the second mode of fulfillment, electronically distributing, by the point of sale data processing system, the software item to the device associated with the electronic purchase.

8. The point of sale data processing system of claim 7, wherein the at least one of the one or more processor units further executes the program instructions to:
   create orders for the electronic purchase based on the schedule for the first mode and the second mode of fulfillment for the multiple items; and
   process the orders using the payment for the electronic purchase.

9. The point of sale data processing system of claim 7, wherein the point of sale data processing system is a cash register.

10. The point of sale data processing system of claim 7, wherein the schedule includes scheduled dates for of the first mode and the second mode of fulfillment for one or more portions of the multiple items of the electronic purchase.

11. A computer program product for managing an electronic purchase of multiple items via a network, the computer program product comprising a computer readable storage device having program instructions embodied therewith, the program instructions executable by a point of sale data processing system to cause the point of sale data processing system to perform a method comprising:

receiving, by the point of sale data processing system, an electronic purchase of at least a device functionality item and a software item;

determining, by the point of sale data processing system, a specific mode of fulfillment for each item being purchased;

assigning, by the point of sale data processing system in response to the determining, a first mode of fulfillment to the device functionality item of the electronic purchase, the first mode of fulfillment comprising device enablement;

assigning, by the point of sale data processing system in response to the determining, a second mode of fulfillment to the software item of the electronic purchase, the second mode of fulfillment comprising electronic distribution;

determining, by the point of sale data processing system, a schedule for the first mode and the second mode of fulfillment;

receiving, by the point of sale data processing system, payment for the electronic purchase; and responsive to receiving the payment for the electronic purchase, fulfilling the electronic purchase based on the schedule such that:

in accordance with the first mode of fulfillment, the point of sale data processing system enables one or more features of a device associated with a customer of the electronic purchase, changes a clock speed of the device associated with the customer of the electronic purchase, or, changes a storage capacity of the device associated with the customer of the electronic purchase; and, in accordance with the second mode of fulfillment, electronically distributing, by the point of sale data processing system, the software item to the device associated with the electronic purchase.

12. The computer program product of claim 11, further comprising:

creating, by the point of sale data processing system, orders for the electronic purchase based on the schedule for the first mode and the second mode of fulfillment for the multiple items; and processing, by the point of sale data processing system, the orders using the payment for the electronic purchase.

* * * * *